United States Patent
Carrasco Zanini et al.

(10) Patent No.: US 9,851,721 B2
(45) Date of Patent: *Dec. 26, 2017

(54) SYSTEM AND METHOD FOR CALCULATING THE ORIENTATION OF A DEVICE

(71) Applicant: Saudi Arabian Oil Company, Dhahran (SA)

(72) Inventors: Pablo Carrasco Zanini, Thuwal (SA); Ali Outa, Thuwal (SA); Fadl Abdellatif, Thuwal (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/174,714

(22) Filed: Jun. 6, 2016

(65) Prior Publication Data
US 2016/0282877 A1 Sep. 29, 2016

Related U.S. Application Data

(63) Continuation of application No. 14/553,885, filed on Nov. 25, 2014, now Pat. No. 9,360,311.
(Continued)

(51) Int. Cl.
 G05D 1/02 (2006.01)
 G01B 21/22 (2006.01)
 F16L 101/30 (2006.01)

(52) U.S. Cl.
 CPC ........... *G05D 1/0268* (2013.01); *G01B 21/22* (2013.01); *G05D 1/027* (2013.01); *G05D 1/0274* (2013.01); *F16L 2101/30* (2013.01)

(58) Field of Classification Search
 CPC ............................. G05D 1/0268; G01B 21/22
 See application file for complete search history.

(56) References Cited

U.S. PATENT DOCUMENTS

| 5,213,176 A | 5/1993 | Oroku et al. |
| 6,199,000 B1 * | 3/2001 | Keller ................. A01B 79/005 |
| | | 342/357.52 |

(Continued)

FOREIGN PATENT DOCUMENTS

| JP | H10 49229 | 2/1998 |
| KR | 101 228 516 | 1/2013 |
| WO | WO 2014/076806 | 5/2014 |

OTHER PUBLICATIONS

Tâche, Fabien, et al. "Compact Magnetic Wheeled Robot With High Mobility for Inspecting Complex Shaped Pipe Structures" pp. 1-6. Oct. 29, 2007-Nov. 2, 2007.
(Continued)

*Primary Examiner* — Alex C Dunn
(74) *Attorney, Agent, or Firm* — Leason Ellis LLP

(57) ABSTRACT

A system and method for determining orientation of a vehicle is provided. The method includes the steps of providing a vehicle having a hinge joint such that sections of the chassis are capable of rotation with respect to each other. A first and second wheel is mounted to one and the other of the chassis sections, respectively. Vehicle geometric data defining a distance between the hinge joint and the centers of the first and second wheels, respectively, and the diameter of the wheels is provided. Surface geometric data defining the curvature of the surface can be provided. The angle of rotation about the hinge joint is measured. An orientation of the vehicle relative to the surface based on the vehicle geometric date, the surface geometric data, and the measured angle of rotation can be determined. A system and method for determining the orientation of an object is also provided.

25 Claims, 11 Drawing Sheets

Related U.S. Application Data

(60) Provisional application No. 61/910,341, filed on Nov. 30, 2013.

(56) References Cited

U.S. PATENT DOCUMENTS

| | | | | |
|---|---|---|---|---|
| 6,896,078 | B2* | 5/2005 | Wakui | B25J 5/007 180/212 |
| 7,731,210 | B2* | 6/2010 | Pedersen | B60G 21/007 180/209 |
| 7,949,437 | B2 | 5/2011 | Wong et al. | |
| 8,190,337 | B2* | 5/2012 | McClure | A01B 69/008 701/23 |
| 8,327,960 | B2* | 12/2012 | Couture | B25J 5/005 180/9.1 |
| 8,515,612 | B2* | 8/2013 | Tanaka | G05D 1/0274 700/245 |
| 8,957,355 | B1* | 2/2015 | Truncale | F42B 15/01 244/3.1 |
| 9,056,629 | B2* | 6/2015 | Kamo | B62D 11/003 |
| 2004/0039510 | A1* | 2/2004 | Archer | A62C 27/00 701/48 |
| 2009/0164067 | A1* | 6/2009 | Whitehead | A01B 79/005 701/41 |
| 2011/0166737 | A1* | 7/2011 | Tanaka | G05D 1/0217 701/25 |
| 2011/0196583 | A1* | 8/2011 | Petzold | B66C 23/78 701/50 |
| 2011/0282536 | A1* | 11/2011 | Rooney, III | B63B 59/10 701/23 |
| 2012/0185129 | A1* | 7/2012 | Carrier | B62D 53/005 701/36 |
| 2013/0054133 | A1* | 2/2013 | Lewis | G01C 21/3407 701/423 |
| 2014/0373496 | A1* | 12/2014 | Schott | A01D 34/008 56/10.2 E |
| 2015/0151572 | A1* | 6/2015 | Parrott | B60B 19/12 301/5.23 |

OTHER PUBLICATIONS

Tâche, Fabien, et al. "Magnebike: A Magnetic Wheeled Robot With High Mobility for Inspecting Complex Shaped Structures". Article first published online: Mar. 6, 2009. pp. 1-33.

"Advanced Environmental Technologies."—Robotics and Inspection Services. 2008. Web. Sep. 24, 2014. <http://www.aettopgun.com/pipe.html>. p. 1 of 1.

"Internal Inspection of Small Pipes; PIPETRON". HiBot Corporation. Grren Innovations Jetro Partnerships. 2005-2012.

"Stainless Steel V-Groove Wheel Casters W-313-SVB-1/2." Hamilton. Web. Sep. 23, 2014. <http://www.hamiltoncaster.com/Casters/Stainless_Steel_Casters/Stainles>. pp. 1-2.

"V Groove Caster Wheels." Caster City. Web. Sep. 23, 2014. <http://www.castercity.com/vgroovew.htm>. pp. 1-3.

"Pipe Handling Conveyors." Cisco-Eagle. Web. Sep. 23, 2014. <http://www.cisco-eagle.com/catalog/c-3278-pipe-handling-conveyor.aspx>. pp. 1-4.

Oddbot. "Service Droid—The Build". Service Droid—The Build Let's Make Robots. Sep. 7, 2013. Web. Oct. 4, 2013. Pages 1-7. <http://letsmakerobots.com/node/38376?page=1>.

"HR-MP5 Features." Light Weight Magnetic Climbing Robot. Web. 2010-2014.

Tâche, Fabien, et al. "Adapted Magnetic Wheel Unit for Compact Robots Inspecting Complex Shaped Pipe Structures," Advanced intelligent mechatronics, Sep. 4-7, 2007 IEEE/ASME international conference. pp. 1-6.

"Solid Polymer Converyor Rollers." Power-Core. Web. Sep. 23, 2014. <http://www.intechpower.com/products/solid-polymer-conveyor-rollers-/>. pp. 1-2.

"CamOnWheels." CamOnWheels RSS. Web. Sep. 23, 2014. <http://www.camonwheels.com/>. pp. 1-2.

"Pipe Wheels." DH Casters Wheels. Web. Sep. 23, 2014. <http://www.dhcasters.com/pipe-wheels-p-1032-1-en.html>. pp. 1-2.

Saiigdeok Park et al: "Design of a mobile robot system for automatic integrity evaluation of large size reservoirs and pipelines in industrial fields", Proceedings of the 2003 IEEE/RSJ International Conference on Intelligent Robots and Systems. (IROS 2003). Las Vegas, NV, Oct. 27-31, 2003; [IEEE/RSJ International Conference on Intelligent Robots and Systems], New York, NY: IEEE, US, vol. 3, Oct. 27, 2003 (Oct. 27, 2003), pp. 2618-2623, XP010675570, DOI: 10.1109/IROS.2003.1249265 ISBN: 978-0/7803-7860-5.

Hernando Leon-Rodriguez et al: "A compact wall-climbing and surface adaptation robot for non-destructive testing", Control, Automation and Systems (ICCAS), 2012 12th International Conference on, IEEE, Oct. 17, 2012 (Oct. 17, 2012), pp. 404-409, XP032291825, ISBN: 978-1-4673-2247-8.

Sangdeok Park et al: "Design of a mobile robot system for automatic integrity evaluation of large size reservoirs and pipelines in industrial fields", Proceedings of the 2003 IEEE/RSJ International Conference on Intelligent Robots and Systems. (IROS 2003). Las Vegas, NV, Oct. 27-31, 2003; [IEEE/RSJ International Conference on Intelligent Robots and Systems], New York, NY: IEEE, US, vol. 3, Oct. 27, 2003 (Oct. 27, 2003), pp. 2618-2623, XP010675570, DOI: 10.1109/IROS.2003.1249265 ISBN: 978-0-7803-7860-5.

\* cited by examiner

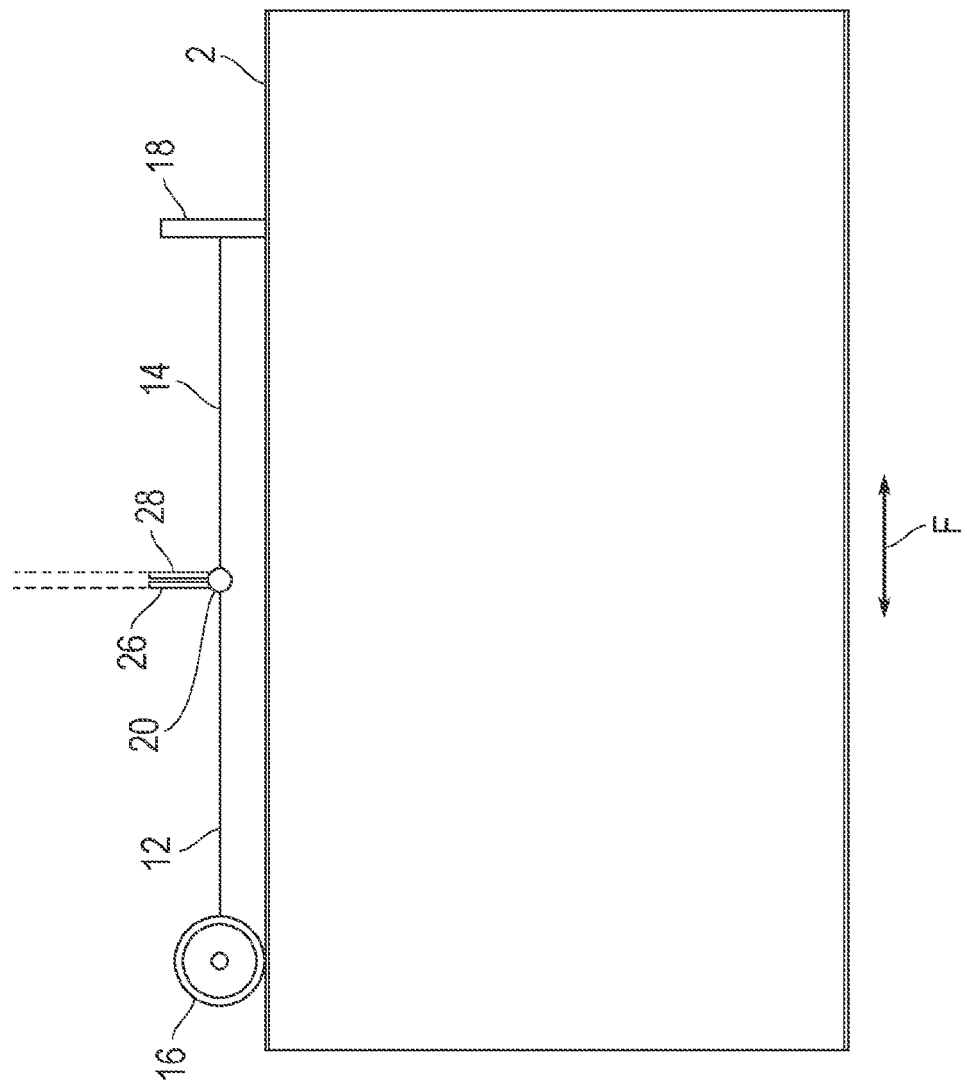

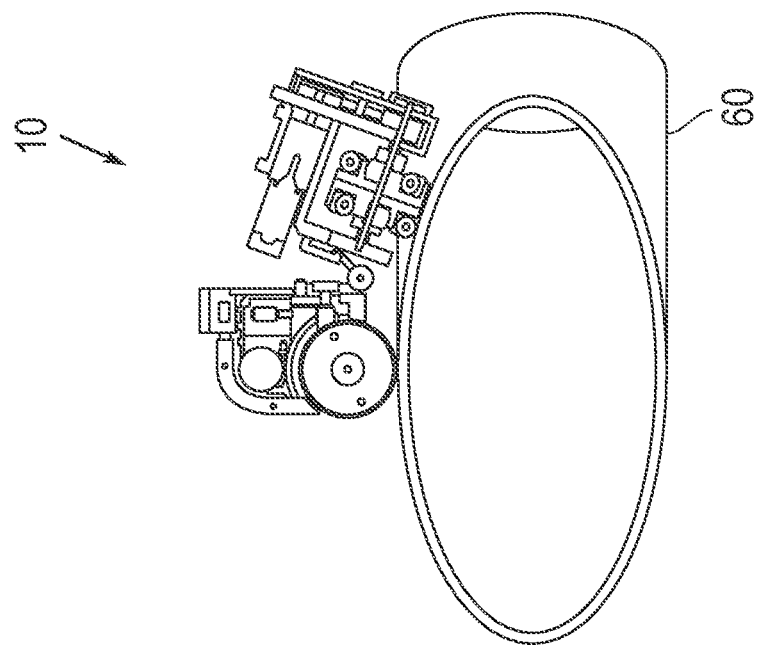
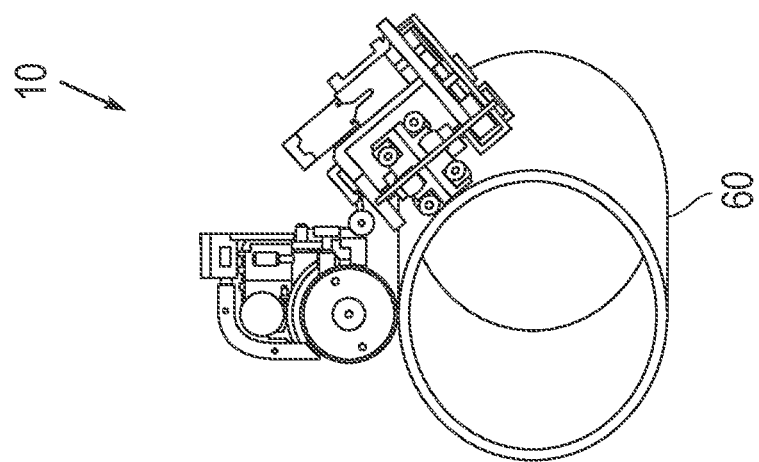
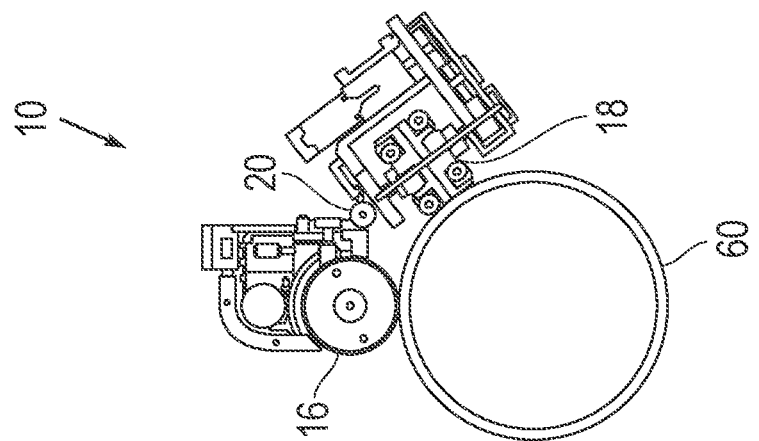

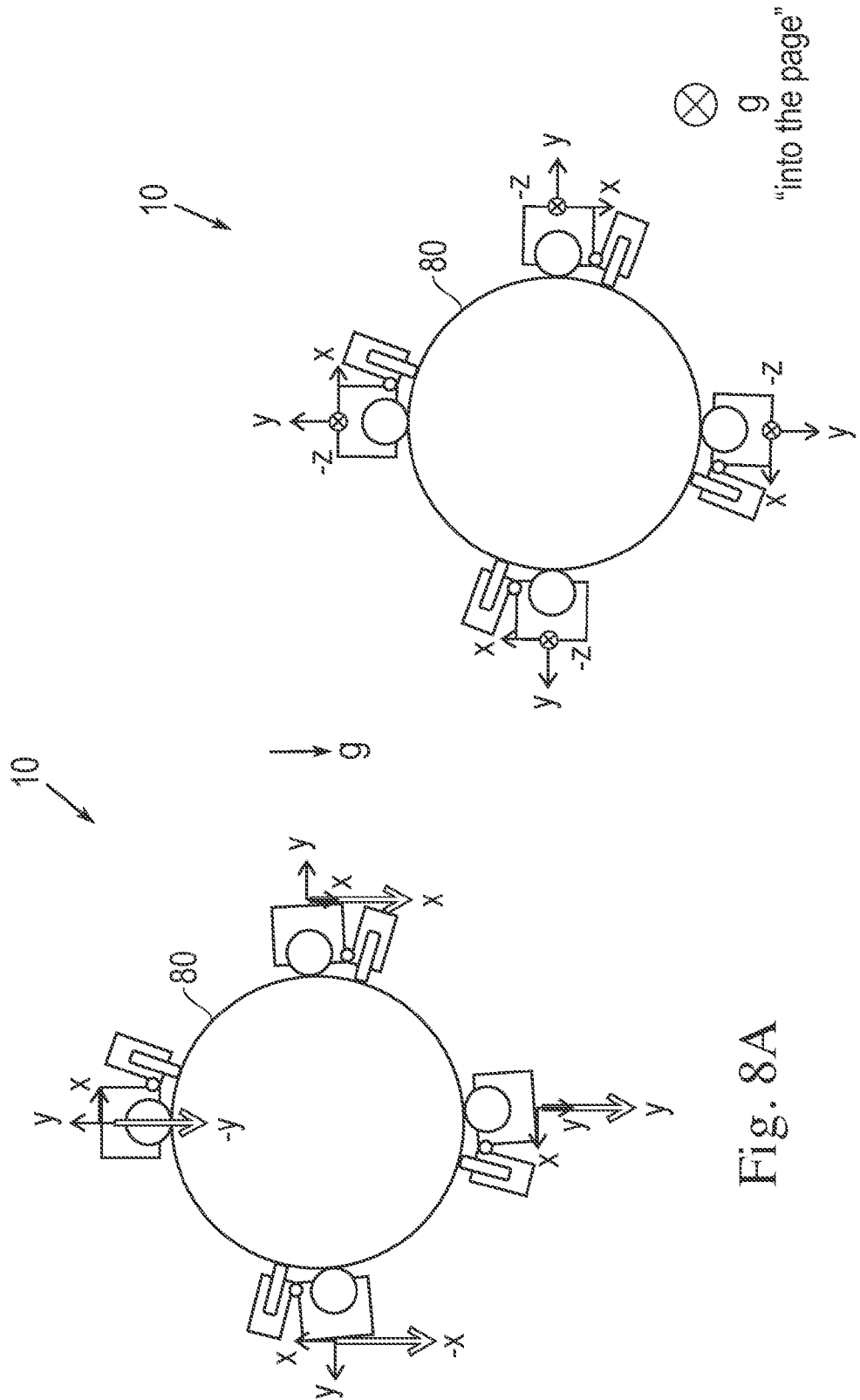

SYSTEM AND METHOD FOR CALCULATING THE ORIENTATION OF A DEVICE

CROSS-REFERENCE TO RELATED APPLICATIONS

This application is a continuation of U.S. Non-Provisional application Ser. No. 14/553,885, filed Nov. 25, 2014, which is based on and claims priority to U.S. Provisional Patent Application Ser. No. 61/910,341, filed on Nov. 30, 2013, each of which is hereby incorporated by reference as if expressly set forth in their respective entireties herein.

FIELD OF THE INVENTION

The present invention relates to the orientation of a device, and in particular, systems and methods of determining the orientation of a device relative to a surface.

BACKGROUND

In mobile robotics, localization data is understood as the data that determines the position and orientation of an object relative to a reference frame. Accurate localization data is required for proper navigation, path planning, mapping and other tasks in this field. In general, sensing techniques associated with localization can be classified into absolute and relative referencing techniques. Relative techniques include using rotary encoders to keep track of the rotation of the components of the driving trains and wheels of a vehicle. These techniques lack an absolute reference frame and thus usually experience issues with cumulative error and drifting signals.

Some examples of absolute referencing techniques include Global Positioning Systems (GPS) and Inertial Measurement Units (IMUs). GPS works well for global positioning but small scale applications often times require higher resolution/accuracy and GPS cannot provide orientation data, only positioning. On the other hand, IMUs are excellent performers in terms of orientation data but do not perform well for positioning. Lastly, it is relevant to highlight that IMU's performance is significantly compromised when the orientation angle that requires measuring is around an axis which is parallel to the direction of the gravitational field around the device.

The present invention addresses these and other problems.

SUMMARY

According to an aspect of the present invention, a method for determining orientation of a vehicle relative to a surface is provided. The method includes the steps of providing a vehicle having a first chassis section, a second chassis section, and a hinge joint connecting the first and second chassis sections such that the first and second chassis sections are capable of rotation with respect to each other in at least a first direction. The vehicle further includes a first wheel mounted to one of the first and second chassis sections and a second wheel mounted to the other of the first and second chassis sections. The method further comprises providing vehicle geometric data defining at least a distance between the hinge joint and a center of the first and second wheels, respectively, and a diameter of each of the wheels. The method further comprises providing surface geometric data defining a curvature of the surface and measuring an angle of rotation about the hinge joint. The method also comprises determining an orientation of the vehicle relative to the surface based on the vehicle geometric data, the surface geometric data, and the measured angle of rotation.

According to a further aspect, the first wheel is a magnetic drive wheel.

According to a further aspect, the second wheel is a magnetic drive wheel.

According to a further aspect, the vehicle is capable of traversing a curved surface in a helical path.

According to another aspect of the present invention, a system for determining orientation of a vehicle relative to a surface having defined geometric data that represents a curvature of the surface is provided. The system includes a vehicle having a first chassis section, a second chassis section, and a hinge joint connecting the first and second chassis sections such that the first and second chassis sections are capable of rotation with respect to each other in at least a first direction. The vehicle further includes a first wheel mounted to one of the first and second chassis sections, a second wheel mounted to the other of the first and second chassis sections, and a sensor configured to measure an angle of rotation about the hinge joint. The system further includes a processor configured to determine an orientation of the vehicle relative to the surface, based on defined vehicle geometric data, the surface geometric data, and a measured angle of rotation about the hinge joint.

According to a further aspect, the defined vehicle geometric data includes at least a distance between the hinge joint and a center of the first and second wheels, respectively, and a diameter of the wheels.

According to a further aspect, the first wheel is a magnetic drive wheel.

According to a further aspect, the second wheel is a magnetic drive wheel.

According to a further aspect, the vehicle is capable of traversing a curved surface in a helical path.

According to another aspect of the present invention, a method for determining orientation of a device relative to an object having a surface is provided. The method includes the steps of providing a device having at least first and second elements capable of contacting the surface of the object and a third element capable of measuring at least one variable that is dependent on the orientation of the device with respect to the surface of the object. The method further includes the steps of providing geometric data defining the geometry of the device, providing surface geometric data defining a curvature of the surface, and measuring the variable. The method includes determining an orientation of the device relative to the surface of the object based on the device geometric data, the surface geometric data, and the measured variable.

According to a further aspect, the first and second elements are first and second legs.

According to a further aspect, the first and second legs include gripper elements that are configured to adhere to the surface of the object.

According to a further aspect, the third element includes a third leg connected to the device via a pivot and a sensor configured to measure the rotation of the third leg about the pivot.

According to a further aspect, the third leg includes a third gripper element that is configured to adhere to the surface of the object.

According to a further aspect, the variable is the degree of rotation of the third leg about the pivot.

According to a further aspect, the third element includes first and second pivots that connect the first and second legs to the device and first and second sensors that are configured to measure the rotation of the of the first and second legs, respectively.

According to a further aspect, variable includes the degree of rotation of the first and second legs about their respective pivots.

According to a further aspect, the third element is configured to linearly translate with respect to the device and further includes a sensor configured to measure translation with respect to the device.

According to a further aspect, the third element includes a third gripper element that is configured to adhere to the surface of the object.

According to a further aspect, variable is the amount of linear translation of the third element.

According to a further aspect, the third element is a non-contact distance sensor supported by the device and configured measure the distance between the device and the surface of the object.

According to a further aspect, the variable is the distance between the sensor and the surface.

According to another aspect of the present invention, a system for determining orientation of a device relative to an object having surface having defined geometric data that represents a curvature of the surface is provided. The system includes a device having at least first and second elements capable of contacting the surface of the object and a third element capable of measuring at least one variable that is dependent on the orientation of the device with respect to the surface of the object. The system further includes a processor configured to determine an orientation of the device relative to surface, based on defined device geometric data, the surface geometric data, and the measured variable.

According to a further aspect, the first and second elements are first and second legs.

According to a further aspect, the first and second legs include gripper elements that are configured to adhere to the surface of the object.

According to a further aspect, the third element includes a third leg connected to the device via a pivot and a sensor configured to measure the rotation of the third leg about the pivot.

According to a further aspect, the third leg includes a third gripper element that is configured to adhere to the surface of the object.

According to a further aspect, the variable is the degree of rotation of the third leg about the pivot.

According to a further aspect, the third element includes first and second pivots that connect the first and second legs to the device and first and second sensors that are configured to measure the rotation of the of the first and second legs, respectively.

According to a further aspect, the variable includes the degree of rotation of the first and second legs about their respective pivots.

According to a further aspect, the third element is configured to linearly translate with respect to the device and further includes a sensor configured to measure translation with respect to the device.

According to a further aspect, the third element includes a third gripper element that is configured to adhere to the surface of the object.

According to a further aspect, the variable is the amount of linear translation of the third element.

According to a further aspect, the third element is a non-contact distance sensor supported by the device and configured measure the distance between the device and the surface of the object.

According to a further aspect, the variable is the distance between the sensor and the surface.

BRIEF DESCRIPTION OF THE DRAWING FIGURES

FIG. 2B illustrates a schematic of a vehicle on a surface;

FIGS. 6A-6C illustrate a vehicle at an orientation with respect to a surface;

FIGS. 8A-8B illustrate a vehicle with respect to a surface and with respect to a gravitational force.

DETAILED DESCRIPTION CERTAIN OF EMBODIMENTS OF THE INVENTION

The present invention relates to a system and method for determine the orientation of a moving device, for example, a robotic vehicle, pincer, etc., in relation to a surface having a known geometry. For a mechanism (e.g., a vehicle) contacting (e.g., driving on) a known curved surface, the orientation of the mechanism can be determined based on the anatomy of the mechanism and a measured alteration of the mechanism. For example, a mechanism can be provided such that its general shape can be dynamically altered (either actively or passively) in a measurable way in order to allow for the body of the mechanism to self-adjust to the curvature of the surface being touched (or traversed). In addition, the mechanism maintains a fully defined structure during that alteration (e.g., parts of the mechanism can rotate with respect to each other, but the length of the mechanism itself remains unchanged). Using such a mechanism, the measured alterations can be run through a mathematical model to calculate the absolute orientation of the mechanism relative to a particular feature of the curved surface. It is noted that a mechanism that does not maintain a fully defined structure could result in multiple solutions to the mathematical model and so calculating orientation of the vehicle may not be possible. Accordingly, a mechanism can have structure to provide redundant definition (e.g., multiple hinged mechanisms, such as grippers having multiple pincers, which could further be used to determine location as well as orientation information). For ease of illustration, a system and method according to one embodiment is described in connection with a robotic inspection vehicle. However, the system and method is not so limited and can be applied to other devices.

In mobile robotics, localization data is understood as the data that determines the position and orientation of an object relative to a reference frame. Accurate localization data is required for proper navigation, path planning, mapping and other tasks in this field. The system and method of the present invention provide a means for determining the orientation of a vehicle relative to the surface over which it travels. This orientation information can be combined with other data to determine the exact location of a vehicle, how far it is has traveled, and the trajectory path of its travel, as discussed in more detail below.

Figure 1A:
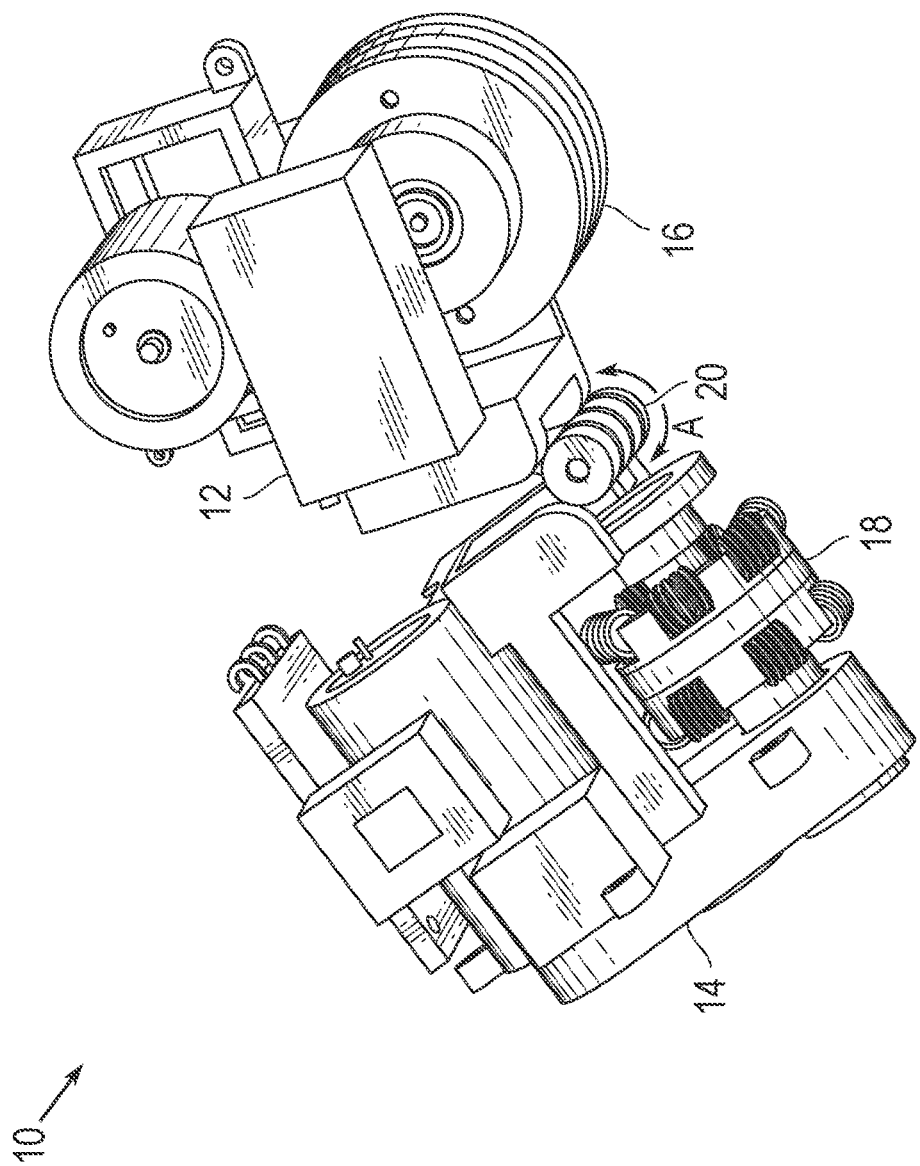
FIG. 1A illustrates a vehicle about which an orientation can be determined.
Figure 3:
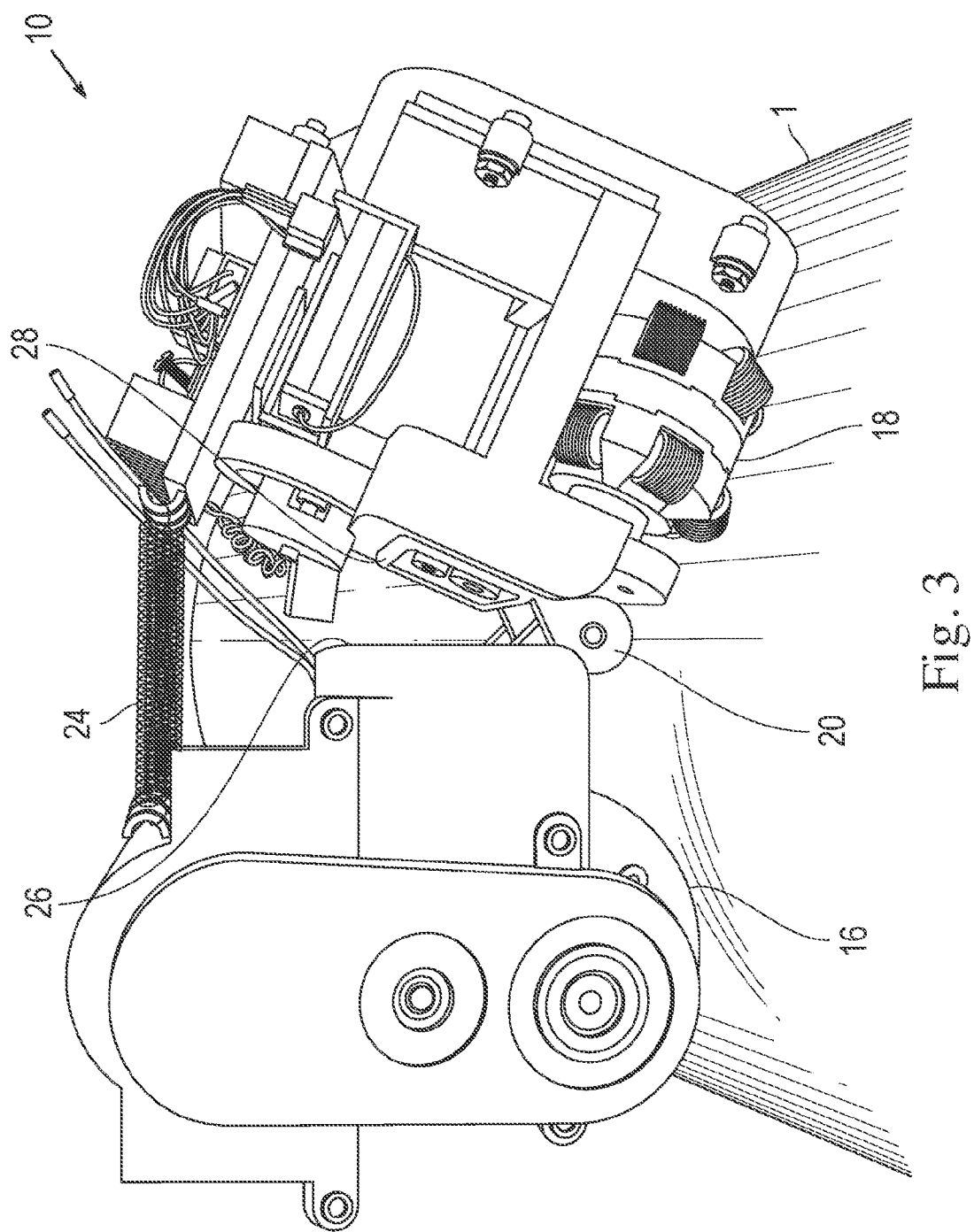
FIG. 3 illustrates a vehicle on a surface.

Referring to FIGS. 1A and 3, a robotic vehicle 10 in accordance with an embodiment of the invention is shown. The robotic vehicle 10 includes a first chassis section 12 and a second chassis section 14. A drive wheel 16 is connected to the first chassis section 12 and an omniwheel 18 is connected to the second chassis section 14. The wheels 16 and 18 and/or the chassis sections can include magnets that provide an attractive force between the vehicle and a ferromagnetic/magnetically inducible material (e.g., a material that generates an attractive force in the presence of a magnetic field, such as a steel pipe). The magnets can be selected such that they provide sufficient attractive force to permit the vehicle to travel in vertical and/or inverted positions when traveling along ferromagnetic/magnetically inducible surfaces. The first and second chassis sections are connected together via a hinge 20. The hinge 20 can by of several different types, including a knuckle/pin hinge, ball and detent hinge, for example). Other types of structures can be used to provide a degree of freedom between the two chassis sections. For example, a flexible material (e.g., flexible plastic) can be used to connect the two chassis sections together while providing the degree of freedom between the two chassis sections. The hinge 20 provides a degree of freedom of movement between the first and second chassis sections so that they can rotate with respect to each other as indicated by arrow "A". A degree of freedom of movement, which allows for rotation between the first and second chassis sections 12, 14, provides the flexibility of movement for the vehicle to traverse curved surfaces while the drive wheel 16 and omniwheel 18 remain in contact with and oriented normal to the curved surface 1 (e.g., steel pipe).

Figure 1B:
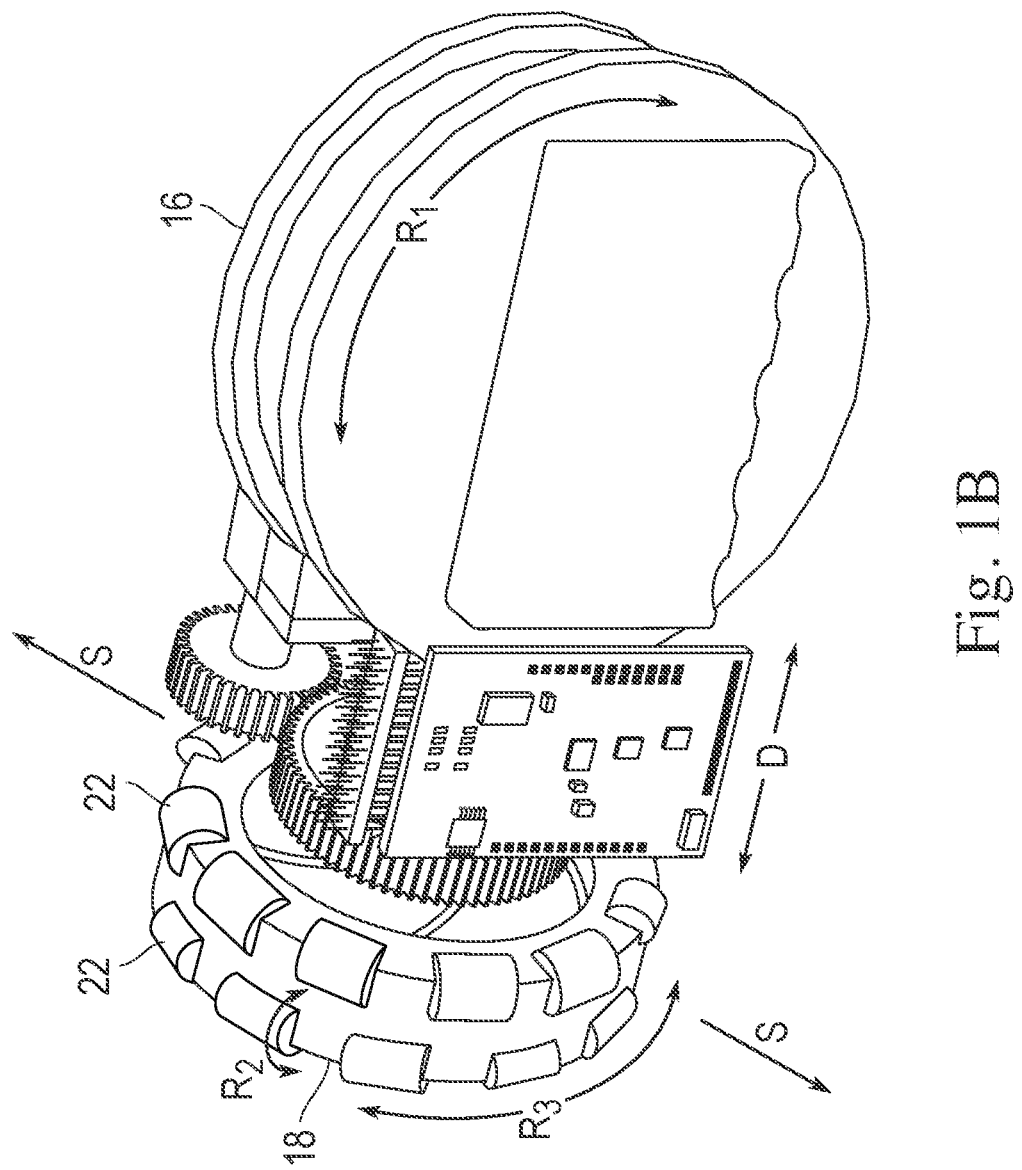
FIG. 1B illustrates additional features of a vehicle about which an orientation can be determined.

Referring now to FIG. 1B, a simplified sketch shows the orientation of the drive wheel 16 and the omni-wheel 18, without illustrating the hinged chassis. In an embodiment of a robotic vehicle that has a preferred direction of travel that is indicated by arrow "D," the drive wheel 16 of the robotic vehicle 10 rotates about its access in a direction indicated by arrow "R1" in response to a motor that propels the vehicle forward. The axis of rotation of the omni-wheel 18 is nominally oriented perpendicular to the drive wheel 16 (and the wheels are in orthogonal planes), as shown in FIG. 1B. The omni-wheel 18 includes a plurality of rollers 22 that are located around the periphery of the omni-wheel 18. The rollers 22 are mounted on the omni-wheel 18 (via pins or axles, for example) for rotation in the same direction as the drive wheel 16, as indicated by arrow "R2" (i.e., R1 is the same direction as R2). Accordingly, when the drive wheel 16 is driven, the omni-wheel 18 can serve as a follower wheel that is not driven. The rollers 22 passively rotate as the drive wheel 16 is driven, thereby allowing the vehicle to travel in the driven direction as indicated by arrow "D" with the rollers serving the purpose of reducing the friction of the passive omni-wheel 18, at least that is the result when the vehicle 10 is moving along a level surface.

The omni-wheel 18 provides steering, or rotation, to control the robotic vehicle 10. The vehicle 10 can be steered by driving the omni-wheel 18 using the motor mentioned above, or a second motor (neither separately shown) by using conventional linkages between the omni-wheel and the motor. The omni-wheel rotates in a direction indicated by arrow "R3". Rotation of the omni-wheel causes the vehicle to turn or steer in a direction indicated by arrows "S". Controlling the rotation of the omni-wheel 18 allows for steering of the vehicle 10. The hinge 20 is constructed to have minimal to no yield as the omni-wheel is driven in the "S" directions so that the vehicle can be rotated in the direction "S" without the vehicle folding upon itself and so that movement in the "S" direction of the omni-wheel 18 can be correlated with a re-orientation of the drive wheel 16 as a result of the movement transferred to the drive wheel through the hinge 20.

Accordingly, the drive wheel 16 can be controlled to provide forward and rearward movement of the vehicle while the omni-wheel 18 is either a passive, low resistance follower wheel or serving as an active, steering mechanism for the vehicle. The wheels 16, 18 can be activated and driven separately or at the same time to effect different types of steering of the vehicle 10.

The configuration of the wheels of the vehicle provide for excellent mobility and stability while maintaining a relatively small foot print. This permits the robot to fit into small areas and have maneuverability that would be difficult, if not impossible, to achieve with traditional arrangements such as four wheeled vehicles. For example, a vehicle having the described arrangement can be constructed so that it can be effective on surfaces ranging from 8 inches in diameter to completely flat surfaces. The drive wheel 16 provides stability to the vehicle. In particular, the drive wheel includes a strong magnet which creates a pull force between the wheel and a ferromagnetic surface on which the vehicle 10 can be moved, and this structural arrangement assists in resisting tipping of the vehicle. In addition, the drive wheel can have a relatively wide and flat configuration, which further provides stability to the vehicle.

Referring to FIG. 3, the vehicle 10 is shown traversing a curved ferromagnetic surface 1, which, by way of example only, can be a steel pipe. The drive wheel 16 and the omni-wheel 18 can each include a magnet. For example, a magnet can be included in the hub of each of these wheels, or in the case of a double omni-wheel, (as shown, in FIG. 3) between the two hubs. By connecting the drive wheel and the omni-wheel to respective chassis sections, each chassis section is attracted (via the magnets in the wheels) to the ferromagnetic/magnetically inducible material surface (e.g., a material that generates an attractive force in the presence of a magnetic field, such as a steel pipe). Alternatively, or in addition, the chassis sections themselves could include magnets that provided attractive force between each chassis section and the ferromagnetic surface. As such, when the vehicle traverses a curved or uneven surface, each of the chassis sections can be magnetically attracted to the surface. Meanwhile, the hinge 20 enables the chassis sections to rotate relative to one another. By this arrangement, the drive wheel 16 and the omni-wheel 18 maintain contact with and normal to the surface along which the vehicle 10 is traveling. A spring 24 can also extend between the two chassis sections 12, 14 and be connected so as to provide an urging force to assist the sections back to the a position in which the two wheels are located on the same planar surface with approximately zero degrees of rotation between the two chassis sections.

Figure 2A:
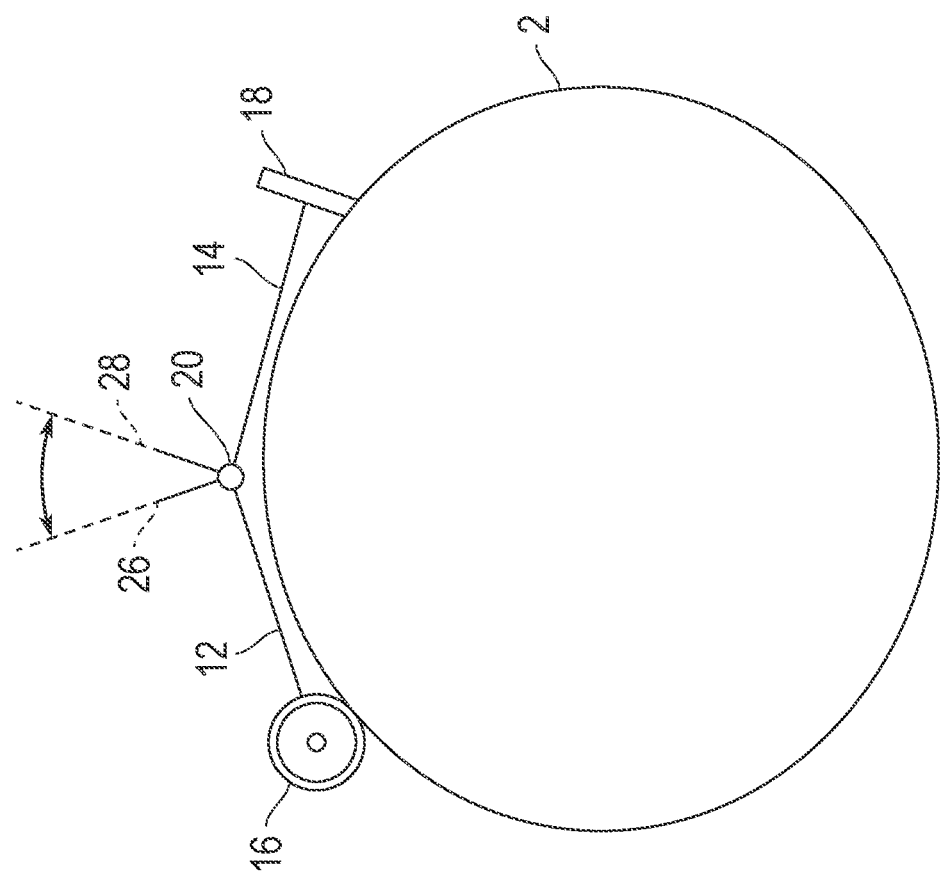
FIG. 2A illustrates a schematic of a vehicle on a surface.

Referring to FIGS. 2A and 2B, a schematic of the robotic vehicle on a curved surface and a flat, planar surface is shown. As shown in FIG. 2A, the chassis sections rotate about the hinge 20 so that the wheel are in contact with curved surface 2 (e.g., a pipe). Without the hinge 20, the chassis would remain in a straight line configuration and one of the wheels may fail to contact the curved surface or may only be in partial contact with the curved surface. Failure of one or two of the wheels to maintain contact with the traveling surface could result in a significant drop in the attractive force between the magnets of the chassis and surface. This could have a catastrophic result, such as when the vehicle is traversing a vertical or inverted surface, in which the vehicle fails to maintain magnetic purchase with the surface and decouples from the surface. Decoupling of the vehicle can result in damage to the vehicle suffered as a result of the fall, present a danger to workers in the area, and/or could result in the vehicle becoming stuck, which could present further problems. As shown in FIG. 2B, the vehicle 10 is disposed on the curved surface 2 but the vehicle is oriented parallel to the axis of the curved surface (e.g., parallel to the direction of flow "F" of a pipe). Since the vehicle is located on the ridge of the curved surface, the front and rear wheels are located on the same planar surface. As such, the degree of rotation about the hinge is zero.

The hinge 20 can include rotation stops 26 and 28. These can be mating surfaces on each of the first and second chassis sections for example. The rotations stops prevent unintentional rotation about the hinge 20, such as when the vehicle is on a flat surface. For example, the hinges can prevent the vehicle from folding in on itself when on a flat surface such that the hinge joint is dragged on the surface.

As shown in FIG. 2A, the vehicle is orientated perpendicular to the axis or direction of flow of the pipe. In this configuration, an angle or degree of rotation exits about the hinge as indicated by reference numeral 30. When the vehicle is perpendicular to the axis of the curved surface, the angle between the hinge is at its maximum. As shown in FIG. 2B, the vehicle 10 is disposed on the curved surface but the vehicle is oriented parallel to the axis of the curved surface (e.g., parallel to the direction of flow of a pipe). Since the vehicle is located on the ridge of the curved surface, the front and rear wheels are located on the same planar surface. As such, the degree of rotation about the hinge is zero. In this orientation, the angle about the hinge is at its minimum, namely, zero. As the vehicle transitions from an orientation in which the vehicle is perpendicular to the axis of the surface to an orientation in which the vehicle is parallel to the axis of the surface, the angle about the hinge decreases from its maximum to its minimum. By measuring the value of the angle about the hinge, the orientation of the vehicle relative to the curved surface can be determined, as discussed in more detail below.

The value in degrees of this angle is a function of the geometry of the vehicle, the diameter of the curved surface (e.g., pipe) on which the vehicle is located, and orientation of the vehicle with respect to the curved surface. The geometry of the vehicle, which can include the diameter of the wheels and the distance between the wheels and the hinge, are factors that can be measured and known and that remain constant during an inspection performed by the robot. In addition, the diameter of the surface on which the vehicle will be deployed to inspect (e.g., curved pipe) is a factor that can be measured and known and that remains constant during an inspection performed by the robot. In addition, the angle about the hinge in degrees can be measured via a sensor (e.g., using a potentiometer, encoder, strain gauge, the relative difference between 2 Inertial Measurement Units, one mounted on the driving module and another on the steering module over a short period of time, or other suitable sensors, etc.). Using the known and constant factors associated with the vehicle and the surface, combined with the measured angle about the hinge, the orientation of the vehicle can be calculated.

The follow example illustrates a method of calculating the orientation of a vehicle of a particular geometry traversing a curved surface of a particular geometry, in this example a pipe. Using the exemplarily calculations, localization data of the vehicle can be determine which is useful for determining the position of the vehicle and identifying the location at which inspection data is being collected in order to determine where a failure in a structure may be located. The localization scheme allows the vehicle to constantly and accurately determine its position and orientation with respect to the pipe. Thus, the inspection data can then be accurately mapped to the pipe geometry to allow the operator to pinpoint anything noticed in the incoming sensor data and locate it. The ability to accurately determine the position of the vehicle and associate that position with inspection data allows for the production of reliable ultrasonic scans for thickness measurements and corrosion maps.

In order to provide a full scan and a comprehensive corrosion map of the pipe, the vehicle can autonomously follow a helical path around the pipe. A helical path offers significant advantages over a rasterized (zigzag) scan path or circular scan path. In a circular scan path, once a loop is completed, the longitudinal position of a typical crawler must be incremented along the pipe axis. This process of completing a circular scan and then advancing is repeated until a desired length of a pipe is covered. In a longitudinal of rasterzid scan, and once the desired length of pipe has been scanned, the crawler must increment its angular position and then perform another linear scan. The process is repeated in the desired area has been covered. Most of these crawlers are not highly mobile but instead use support brackets that provide a static platform upon which the crawler can move in an X-Y motion (circumferential and longitudinal) to cover the desired scan area. This means that access to the desired scanning area is a requirement in order to provide the support brackets. The vehicle 10 described above is highly mobility and does not require static support brackets. Rather, it can freely roam on the pipe without such brackets. Therefore, there is no need to have access to the desired scan area and so the vehicle can be deployed at any point along the pipe and then it can be driven to the desire location. Having such a capability enables it the vehicle to perform less restricted motions and maneuvers. Further, the mobility of the vehicle permits the vehicle to traverse a helical path while it is performing ultrasonic scanning.

Following a helical path simplifies the steering control of the vehicle as compared to following an X-Y scanning motion. In a helical path, the vehicle is commanded to drive forward at a given rate and minor steering corrections can be performed to achieve the desired helical path. This provides for a more efficient control method over X-Y scanning methods that require complex steering maneuvers. A helical scan path can result in a longer battery life for the vehicle. Compared to a helical scan, scanning a pipe using X-Y scanning can lead to excessive battery consuming due to the complex steering required after every scan line. Moreover, if a vehicle was require to move against gravity during every scanning line, which would occur for significant portions of a linear scan, excessive power consumption can occur. Localization of a crawler in an X-Y scan path is more complicated and less error-tolerant. Errors in determination of position are more likely to occur during the complicated steering maneuvers required after scan every line in an X-Y system.

In a helical scan path, localization can be achieved via helical pitch control and helix loop start/end control. Helix pitch control ensures that the pitch of the helix (space between each loop and the next one) is constant along the whole helical path. Helix loop start/end control ensures that the vehicle is able to determine when a loop of helix ends and the next one starts.

The vehicle can ensure that the space between each loop and the next one (helix pitch) is constant. Accordingly, the vehicle can follow a desired helical path to map the acquired inspection data to the correct corresponding position. As the vehicle progresses along the pipe, a control method can be implemented to control the helix pitch and ensure the loops are similarly spaced from each other. Controlling the pitch provides for a known, uniform scan path.

The pitch of the vehicle's trajectory around the pipe can be controlled by monitoring and controlling the orientation of the vehicle with respect to the pipe (longitudinal, helical with any pitch, or circumferential). By measuring the orientation angle, a control loop can ensure the angle is maintained and thus the helix pitch is maintained. The orientation of the vehicle with respect to the pipe can be determined by measuring the angle of the hinge between the steering and driving modules (the angle between the first and second chassis section) of the vehicle. Including the hinge between the vehicle sections provides the ability to measure the angle about the hinge. The hinge also provides a self-adjustment feature to the vehicle that permits the vehicle to operate on surfaces of various curvatures and pipe diameters.

Figure 5B:
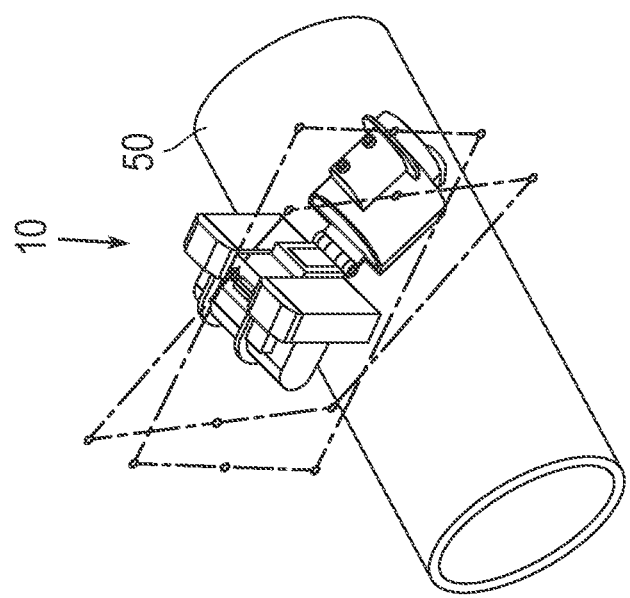
FIGS. 5A-5B illustrate a vehicle at an orientation with respect to a surface.
Figure 5A:
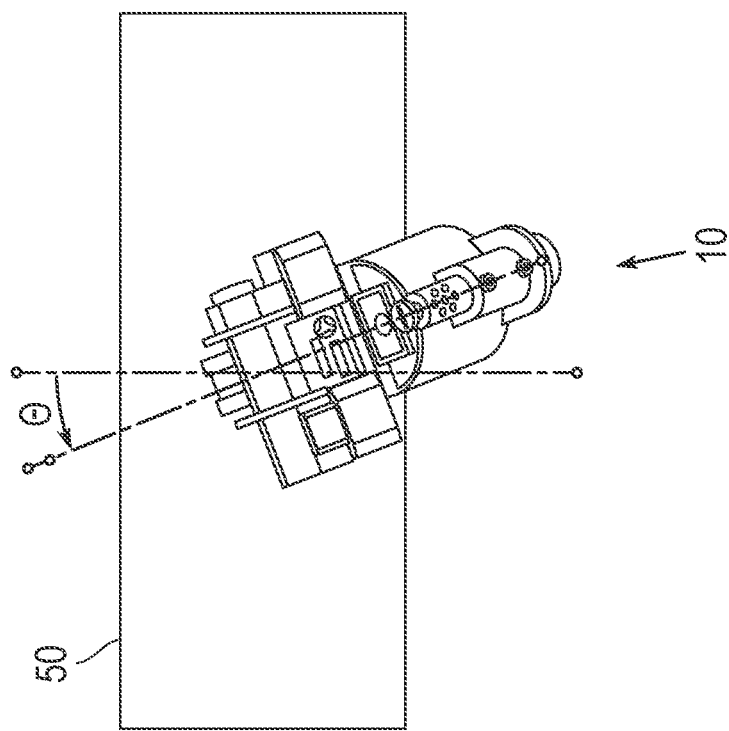

A measurement convention for the vehicle orientation angle with respect to the pipe can be set. FIGS. 5A and 5B illustrate an exemplary measurement convention for the angle ($\theta$). According to the convention, when the vehicle 10 is orientating perpendicular to the pipe 50, which would result in the vehicle traveling on a circumferential (circular) path, $\theta$ is zero degrees. When the vehicle is oriented in the same direction as the flow of the pipe, which would result in the vehicle traveling along the pipe's length, $\theta$ is 90 degrees. Accordingly, as the vehicle's orientation with respect to the pipe changes from perpendicular to longitudinal, $\theta$ increase from zero to 90 degrees. The mathematical modeling on the 2D cross-sectional plane created by the center vehicle plane. This is the same plane with the angular shift $\theta$. FIGS. 6A-6B show the cross section of the pipe 60 relative to the vehicle 10 for different values of 0. FIG. 6A illustrates a cross section that is for a circumferential path where $\theta$ is zero. As can be seen in FIGS. 6B and 6C, increasing $\theta$ makes the cross section of the pipe become an ellipse whose major axis increases with $\theta$.

Figure 7:
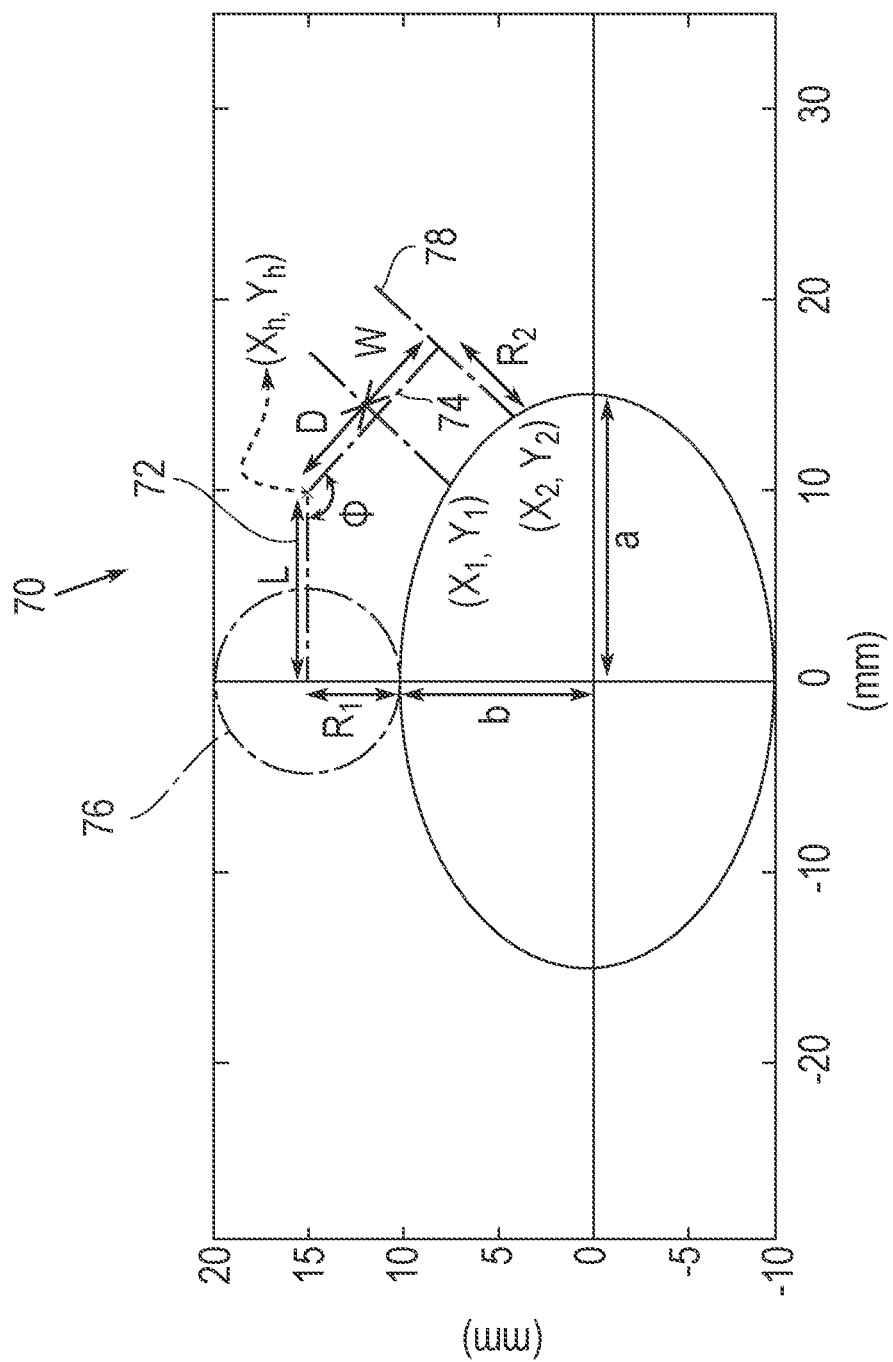
FIG. 7 illustrates a graphical representation of a vehicle on a surface.

Referring to FIG. 7, a vehicle 70 is represented in wire form. The vehicle 70 includes a first chassis section 72, a second chassis section 74, a drive wheel 76 and an omni-wheel 78 mounted orthogonally with respect to the drive wheel 76. The vehicle is disposed on a pipe 71 that has an elliptical cross section for a specific value of $\theta$. The parameters of the vehicle and pipe are represented by the following mathematical notations, where:

$\Phi$: hinge angle
a: major axis of the ellipse cross section of the pipe
b: minor axis of the ellipse cross section of the pipe
R1: radius of magnetic driving wheel
R2: radius of omni-wheel
L: length of the virtual rigid link between the driving wheel pivot and the hinge
D: distance between the hinge and the first roller set of the omni-wheel W: width of the omni-wheel (distance between the two roller sets)

$x_1, y_1$: coordinates of the first contact point between the omni-wheel and the pipe $x_2, y_2$: coordinates of the second contact point between the omni-wheel and the pipe $x_h, y_h$: coordinates of the hinge point The minor axis b will be equal to the radius of pipe regardless of the robot orientation $\theta$. The major axis a depends on the orientation and can be determined using the following equation:

$$a = \frac{b}{\cos\theta}$$

Two mathematical models can be used for the hinge angle. A "forward model" permits a determination of the hinge angle $\Phi$ for a given vehicle orientation angle $\theta$. A "inverse model" permits a determination of the vehicle orientation angle $\theta$ for a given hinge angle $\Phi$.

Forward Model

For the forward model, a can be calculated from the formula above since $\theta$ is known. To calculate the hinge angle $\Phi$, a system of six non-linear equations is constructed to solve the six unknowns in the model (x1, y1, x2, y2, xh, yh). These solved for variables can be used to calculate the hinge angle $\Phi$. The six equations are written using the following relationships:

1. Location of first omni-wheel contact point on the ellipse
2. Location of second omni-wheel contact point on the ellipse
3. Distance between the hinge point and the driving wheel axis
4. Distance between the two contact points (omni-wheel width)
5. X-coordinate of the hinge point with respect to the two contact point positions
6. Y-coordinate of the hinge point with respect to the two contact point positions These relationships can be formulated as the following equations:

$$\frac{x_1^2}{a^2} + \frac{y_1^2}{b^2} = 1$$

$$\frac{x_2^2}{a^2} + \frac{y_2^2}{b^2} = 1$$

$$x_h^2 + (y_h - (b + R_1))^2 = L^2$$

$$(x_2 - x_1)^2 + (y_2 - y_1)^2 = W^2$$

$$x_h = x_1 - \frac{R(y_2 - y_1) + D(x_2 - x_1)}{W}$$

$$y_h = y_1 - \frac{R(x_2 - x_1) - D(y_2 - y_1)}{W}$$

These six equations can be written as a system of non-linear equations as follows:

$$X = \begin{bmatrix} x_1 \\ y_1 \\ x_2 \\ y_2 \\ x_h \\ y_h \end{bmatrix}$$

$$F_F(X) = \begin{bmatrix} \frac{x_1^2}{a^2} + \frac{y_1^2}{b^2} - 1 \\ \frac{x_2^2}{a^2} + \frac{y_2^2}{b^2} - 1 \\ x_h^2 + (y_h - (b + R_1))^2 - L^2 \\ (x_2 - x_1)^2 + (y_2 - y_1)^2 - W^2 \\ x_h - \left(x_1 - \frac{R_2(y_2 - y_1) + D(x_2 - x_1)}{W}\right) \\ y_h - \left(y_1 + \frac{R_2(x_2 - x_1) - D(y_2 - y_1)}{W}\right) \end{bmatrix} = 0$$

Solving these equations is can be done using the iterative Newton-Raphson numerical method. In each iteration, the new vector X is calculated as follows:

$$X_{n+1} = X_n - J_F^{-1}(X_n) F_F(X_n)$$

Where $J_F$ is the Jacobean matrix of the system F(X):

$$J_F = \begin{bmatrix} \frac{\partial F_1}{\partial x_1} & \frac{\partial F_1}{\partial y_1} & \frac{\partial F_1}{\partial x_2} & \frac{\partial F_1}{\partial y_2} & \frac{\partial F_1}{\partial x_h} & \frac{\partial F_1}{\partial y_h} \\ \frac{\partial F_2}{\partial x_1} & \frac{\partial F_2}{\partial y_1} & \frac{\partial F_2}{\partial x_2} & \frac{\partial F_2}{\partial y_2} & \frac{\partial F_2}{\partial x_h} & \frac{\partial F_2}{\partial y_h} \\ \frac{\partial F_3}{\partial x_1} & \frac{\partial F_3}{\partial y_1} & \frac{\partial F_3}{\partial x_2} & \frac{\partial F_3}{\partial y_2} & \frac{\partial F_3}{\partial x_h} & \frac{\partial F_3}{\partial y_h} \\ \frac{\partial F_4}{\partial x_1} & \frac{\partial F_4}{\partial y_1} & \frac{\partial F_4}{\partial x_2} & \frac{\partial F_4}{\partial y_2} & \frac{\partial F_4}{\partial x_h} & \frac{\partial F_4}{\partial y_h} \\ \frac{\partial F_5}{\partial x_1} & \frac{\partial F_5}{\partial y_1} & \frac{\partial F_5}{\partial x_2} & \frac{\partial F_5}{\partial y_2} & \frac{\partial F_5}{\partial x_h} & \frac{\partial F_5}{\partial y_h} \\ \frac{\partial F_6}{\partial x_1} & \frac{\partial F_6}{\partial y_1} & \frac{\partial F_6}{\partial x_2} & \frac{\partial F_6}{\partial y_2} & \frac{\partial F_6}{\partial x_h} & \frac{\partial F_6}{\partial y_h} \end{bmatrix}$$

Solving the above equation involves finding the inverse of the Jacobean, which can be time consuming and result in high demand of computing resources. Therefore the following system of linear equations can be used for faster results:

$$J_F^{-1}(X_n)(X_{n+1} - X_n) = -F_F(X_n)$$

For the first iteration, the vector Xn is the initial guess $X_0$. The initial guess used to ensure convergence towards a solution is the case where hinge point has the same y-coordinate as the driving wheel axis and angle hinge Φ is 180 degrees. In this case the initial guess becomes:

$$X_0 = \begin{bmatrix} x_1 \\ y_1 \\ x_2 \\ y_2 \\ x_h \\ y_h \end{bmatrix} = \begin{bmatrix} L + D \\ b + R_1 - R_2 \\ L + D + W \\ b + R_1 - R_2 \\ L \\ b + R_1 \end{bmatrix}$$

After solving the non-linear system, the hinge angle Φ is then calculated in terms of X as follows: ( )

$$\phi(X) = \frac{\pi}{2} + \cos^{-1}\frac{x_h}{R_1 + b - y_h} + \tan^{-1}\frac{x_1 - x_h}{y_h - y_1} + \tan^{-1}\frac{R_2}{D}$$

A summary for the sequence of calculations in the forward model can be represented as follows:

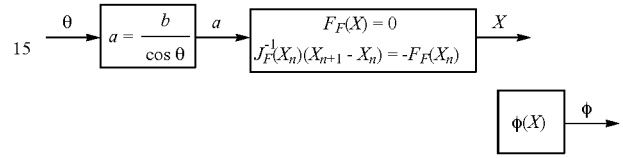

Inverse Model

In the inverse model, hinge angle Φ is given (measured using a potentiometer or other suitable sensor) and the vehicle orientation θ is to be calculated. In this case the major axis a is unknown. To calculate Φ, a system of seven non-linear equations can be constructed to solve the six unknowns in the model (x1, y1, x2, y2, xh, yh, a). These equations are the same six equations from the forward model plus the hinge angle equation Φ. The equations thus are:

$$\frac{x_1^2}{a^2} + \frac{y_1^2}{b^2} = 1$$

$$\frac{x_2^2}{a^2} + \frac{y_2^2}{b^2} = 1$$

$$x_h^2 + (y_h - (b + R_1))^2 = L^2$$

$$(x_2 - x_1)^2 + (y_2 - y_1)^2 = W^2$$

$$x_h = x_1 - \frac{R(y_2 - y_1) + D(x_2 - x_1)}{W}$$

$$y_h = y_1 - \frac{R(x_2 - x_1) - D(y_2 - y_1)}{W}$$

$$\phi = \frac{\pi}{2} + \cos^{-1}\frac{x_h}{R_1 + b - y_h} + \tan^{-1}\frac{x_1 - x_h}{y_h - y_1} + \tan^{-1}\frac{R_2}{D}$$

$$F_I(X) = \left( \begin{bmatrix} x_1 \\ y_1 \\ x_2 \\ y_2 \\ x_h \\ y_h \\ a \end{bmatrix} \right) = \begin{bmatrix} \frac{x_1^2}{a^2} + \frac{y_1^2}{b^2} - 1 \\ \frac{x_2^2}{a^2} + \frac{y_2^2}{b^2} - 1 \\ x_h^2 + (y_h - (b + R_1))^2 - L^2 \\ (x_2 - x_1)^2 + (y_2 - y_1)^2 - W^2 \\ x_h - \left(x_1 - \frac{R_2(y_2 - y_1) + D(x_2 - x_1)}{W}\right) \\ y_h - \left(y_1 + \frac{R_2(x_2 - x_1) - D(y_2 - y_1)}{W}\right) \\ \phi - \left(\frac{\pi}{2} + \cos^{-1}\frac{x_h}{R_1 + b - y_h} + \tan^{-1}\frac{x_1 - x_h}{y_h - y_1} + \tan^{-1}\frac{R_2}{D}\right) \end{bmatrix} = 0$$

This system can also be solved using Netwon Raphson method and the initial guess is:

$$X_0 = \begin{bmatrix} x_1 \\ y_1 \\ x_2 \\ y_2 \\ x_h \\ y_h \\ a \end{bmatrix} = \begin{bmatrix} L+D \\ b+R_1-R_2 \\ L+D+W \\ b+R_1-R_2 \\ L \\ b+R_1 \\ b \end{bmatrix}$$

After solving the non-linear system, the vehicle orientation θ can be calculated in terms of X as follows:

$$\theta = \cos^{-1}\left(\frac{b}{a}\right)$$

A summary for the sequence of calculations in the forward model can be represented as follows:

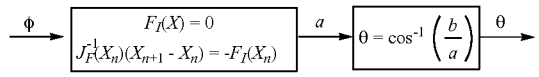

In order to determine when every loop of the helical path ends and the next one starts, a combination of sensor readings can be used including wheel encoders and IMU data (accelerometers, gyroscopes, and magnetometers). The localization scheme used relies on the pipe orientation with respect to the ground because it affects which sensors provide useful readings. If the pipe 80 is horizontal, as shown in FIG. 8A, then the accelerometers will provide useful data in determining the angular position of the vehicle 10 on the pipe. The gravity direction and thus the accelerometers readings will continuously change while vehicle is travelling around the pipe. Having such a variation aids the controller to know when the robot reaches for example the 12 o'clock position and register the end of a helix loop and the start of the next one. If the pipe 80 is vertical, as shown in FIG. 8B, then the accelerometers will not be useful because gravity direction with respect to the vehicle 10 will not change. Therefore, the accelerometers data will not change while the robot moves around the pipe regardless of which orientation the accelerometers are mounted on the robot. This is because the same face of the robot always faces the ground when the robot is running around a vertical horizontal.

Therefore, in the case of a horizontal pipe, the master microcontroller can depend on the accelerometer values to determine the end and start of the helix loops. On an inclined pipe, the accelerometer values can be used as long as the inclination is not close to being vertical; because if the pipe is vertical or close to vertical then the accelerometer values will stay constant or their changes will not be sufficient for meaningful determinations. In this case, other means can be used including magnetometer readings, dead reckoning using wheel encoder values, and/or monitoring external visual references. A Kalman filter or other suitable sensor fusion algorithm can be used to fuse these data for the case of a vertical pipe.

Accordingly, the above equations provide an exemplary method for determine orientation/hinge angle of a vehicle on a curved surface. The method can be adapted to different structures of vehicles/mechanisms that are capable of self-adjusting to a known curvature in a measurable way (e.g., having a hinge that is measured).

Figure 4:
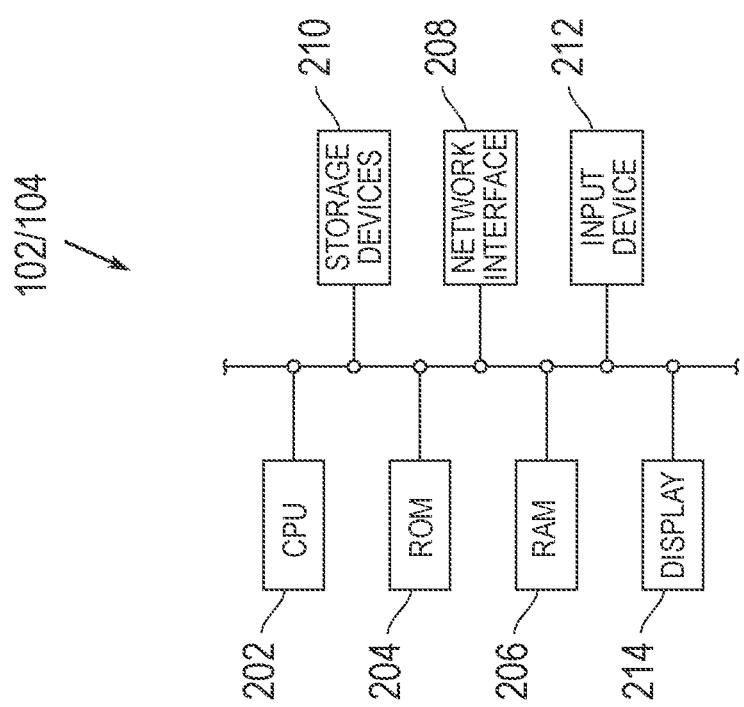
FIG. 4 illustrates a schematic of a system that can be used to determine orientation.

The method for determining the orientation of the vehicle can be performed by a computer having a processor with memory for executing code. As shown in FIG. 4 the functional elements of an information processor 102 are illustrated, and preferably include one or more central processing units (CPU) 202 used to execute software code in order to control the operation of information processor 102, read only memory (ROM) 204, random access memory (RAM) 206, one or more network interfaces 208 to transmit and receive data to and from other computing devices across a communication network, storage devices 210 such as a hard disk drive, flash memory, CD-ROM or DVD drive for storing program code, databases and application code, one or more input devices 212 such as a keyboard, mouse, track ball and the like, and a display 214. The various components of information processor 102 need not be physically contained within the same chassis or even located in a single location. For example, as explained above with respect to databases which can reside on storage device 210, storage device 210 may be located at a site which is remote from the remaining elements of information processors 102, and may even be connected to CPU 202 across communication network 106 via network interface 208. For example, data processing can be performed using processors located on board the robot and transmitted to a remote computer terminal.

The functional elements shown in FIG. 4 (designated by reference numbers 202-214) are preferably the same categories of functional elements preferably present in user computing device 104. However, not all elements need be present, for example, storage devices in the case of PDAs, and the capacities of the various elements are arranged to accommodate expected user demand. For example, CPU 202 in user computing device 104 may be of a smaller capacity than CPU 202 as present in information processor 102. Similarly, it is likely that information processor 102 will include storage devices 210 of a much higher capacity than storage devices 210 present in workstation 104. Of course, one of ordinary skill in the art will understand that the capacities of the functional elements can be adjusted as needed.

For example, sensors measuring the angle of the hinge can provide electrical input signals to the processor. Such signals can undergo analog or digital signal processing before being inputted to the processor 202, such as by a pre-processing module implemented as computer code. Such a module can receive output from an analog-to-digital converter, which in turn receives signals from a sensor, e.g., a strain gauge. The calculations used to determine the orientation of the vehicle can be performed by processors located on board the robotic vehicle. Alternatively, or in addition, sensed data can be transmitted (e.g., through wireless communications) to a remote processor (e.g., a field laptop computer, smartphone, tablet, etc.) to perform the processing to determine the orientation and location of the vehicle.

Determining the orientation of the vehicle is particularly useful in robotic inspection applications. For example, the orientation information can be used to calculate a trajectory of the vehicle as it travels along the surface. This can be used to determine the absolution location of the vehicle. For example, to orientation information can be combined with a measured distance traveled by the vehicle (e.g., by counting rotations of the drive wheel) to determine where along the surface the vehicle is located. In addition, the orientation information can be particularly useful when the vehicle is being used to inspect the surface itself and the vehicle needs to pass over the surface to inspect it. The orientation information can be used to determine whether a desired sweep pattern has been achieved by the robot. For example, the distance and orientation information can be collected as data points and combined to build a map of travel of the vehicle. The map can be a three-dimensional map (e.g., using a cylindrical coordinate system) or can be displayed as a two-dimensional map by converting the cylindrical surface into a flat planar surface. Further, since the trajectory of the robot can be mapped, that location information can be combined with inspection data collected, to create detailed maps in which a map of the structure is overlaid with the inspection data. Thus, data points can be generated that include location information and inspection information (e.g., condition of the surface at that location). The data points can be used to create a detailed map of a pipeline in which areas of corrosion are highlighted on the map. Without the system and method of the present invention, the localization data required to produce such maps would be based in relative referencing with drifting errors which would accumulate over time.

Incorporating the system and method of the present invention in robotic vehicle 10, for example, can provide significant benefits. The system and method can be used for measuring the angle of the hinge as the robot maneuvers on a pipe permits the absolute orientation of the robot with respect to the centerline (or the flow) of the pipe to be accurately calculated. This method can be extrapolated to other mechanisms, vehicles and curved surfaces. This method is unique in that it out performs IMUs in the particular case where the direction of the gravitational force around the vehicle is aligned with the axis of rotation around which the vehicle is pivoting. This alignment between the gravitational force and the axis of rotation can occur, for example, in a condition in which the robot located at the 12 o'clock position on a horizontal pipe and the robot is pivoting/steering in circles in place.

As discussed above, this method has particular application in the control of robotic inspection vehicles. For example, if a robot were to advance along a cylindrical pipe, a particular measurement of a hinge angle can correspond to four possible orientations of the robot relative to the pipe centerline or flow. However, if the original orientation of the robot was known, the system can be configured to store that date and further store data indicating all further orientation changes. As such, the system can keep track of previous measurements of the hinge angle and easily deduce which one of those four possible current orientations is the true one based on the starting orientation and previous orientation changes.

In addition, if the geometry of the robot is known and the orientation of the robot relative to a pipe is known, the measured angle about the hinge can be used to determine the diameter of the pipe. Further, a robot can be placed on a pipe of unknown diameter and then commanded to pivot 181 degrees around its own driving wheel and map the data acquired from the sensor measuring the angle about the hinge. The system can record the maximum angle as the robot rotates, which occurs when the robot is oriented normal to the flow of the pipe (i.e. as if the robot was about to start driving in circles around the pipe circumference). The maximum measured angle, combined with the geometer data of the robot, can be used for determining the diameter of the pipe upon which the robot is traveling. The method can be adapted to different structures of vehicles/mechanisms that are capable of self-adjusting to a known curvature in a measurable way (e.g., having a hinge that is measured). A vehicle could be used to inspect ship hulls, including aerospace and marine hulls. In addition, if such an inspection tool were used on a structure that had a unique curvature over its circumference, the tool's position could be determined by measuring a hinge angle. For example, if the curvature of a submarine were unique across its hull and was known (e.g., could be represented graphically as a parabola), a measured hinge angle could be used to calculate the vehicle orientation and position.

As discussed above, the described technique could be used to vehicles and other mechanisms more generally. For example, a hinged pincer could employee the described methods for determining the orientation of an object being held by the pincers.

The method described above can provide useful data on applications where IMUs would not provide similar information. For example, smart grippers in automated assembly lines (e.g., pincers consisting of first and second prongs connected by a hinge) can be constructed according to the principles of this invention to grab scrambled objects (e.g., a pile of objects in a pile having random orientations), self-adjust to their shape and use the measured changes in the body of the gripper to determine which way the object was grabbed. For example, FIGS. 9A-9H illustrate several embodiments of grippers that can be used to determine the orientation of an object.

Figure 9A:
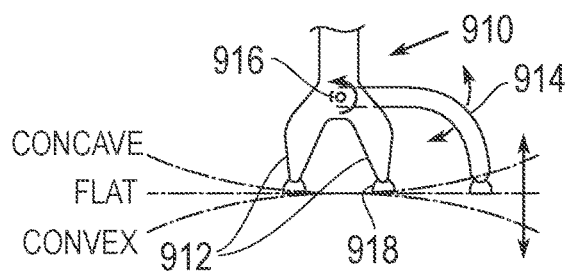
FIGS. 9A-9H illustrate devices that can be used to determine an orientation of an object with respect to the devices.

Referring to FIG. 9A, a gripper 910 has two legs 912 and a third leg 914 connected to the gripper via a pivot 916. The ends of the legs 912 and leg 914 include gripping elements 918 that contact the surface of an object. The object can have either a concave, convex, or flat surface, or combinations thereof. The gripping elements 918 maintain the gripper in contact with the object. The gripper elements can maintain contact with the object via magnetic force, suction force, non-permanent adhesion force, or other suitable means for maintaining the ends of the gripper in contact with the object. The geometric details of the gripper 910 and its legs and gripping elements are known. The geometric details of the object are also known. Accordingly, by measuring the amount of rotation at pivot 916 in accordance with the methods described above the orientation of an object being held by the gripper can be determined. As shown in FIG. 9E, gripper 910 is shown in contact with object X at various orientations along its surface. In accordance with the methods discussed above, the orientation of the object X relative to the gripper can be determined.

Figure 9B:
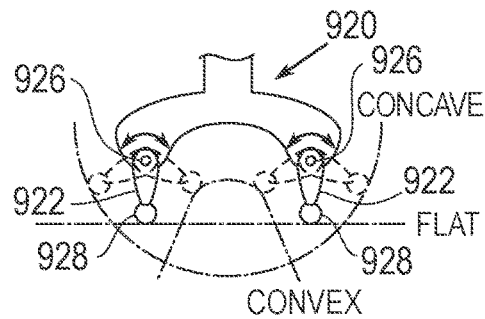

Referring to FIG. 9B, a gripper 920 has two legs 922 each connected to the gripper via a pivots 926. The ends of the legs 922 include gripping elements 928 that contact the surface of an object. The object can have either a concave, convex, or flat surface, or combinations thereof. The gripping elements 928 maintain the gripper in contact with the object. The gripper elements can maintain contact with the object via magnetic force, suction force, non-permanent adhesion force, or other suitable means for maintaining the ends of the gripper in contact with the object. The geometric details of the gripper 920 and its legs and gripping elements are known. The geometric details of the object are also known. Accordingly, by measuring the amount of rotation at pivots 926 in accordance with the methods described above the orientation of an object being held by the gripper can be determined. As shown in FIG. 9F, gripper 920 is shown in contact with object X at various orientations along its surface. In accordance with the methods discussed above, the orientation of the object X relative to the gripper can be determined.

Figure 9C:
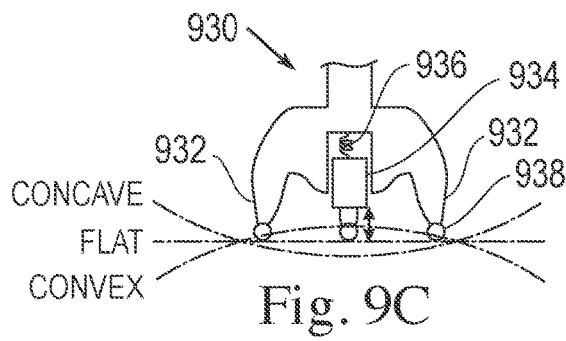

Referring to FIG. 9C, a gripper 930 has two legs 932 each connected to the gripper and an element 934 that is capable of linear displacement. The ends of the legs 932 and element 934 include gripping elements 938 that contact the surface of an object. The object can have either a concave, convex, or flat surface, or combinations thereof. The gripping elements 938 maintain the gripper in contact with the object. The gripper elements can maintain contact with the object via magnetic force, suction force, non-permanent adhesion force, or other suitable means for maintaining the ends of the gripper in contact with the object. The geometric details of the gripper 930 its legs, translation element, and gripping elements are known. The geometric details of the object are also known. Accordingly, by measuring the amount of displacement of element 934 in accordance with the methods described above, wherein the rotation of a pivot is substituted for linear displacement, the orientation of an object being held by the gripper can be determined. The displacement of element 934 can be measured by a sensor, such as a spring strain gauge 936, for example. As shown in FIG. 9G, gripper 930 is shown in contact with object X at various orientations along its surface. In accordance with the methods discussed above, the orientation of the object X relative to the gripper can be determined.

Figure 9D:
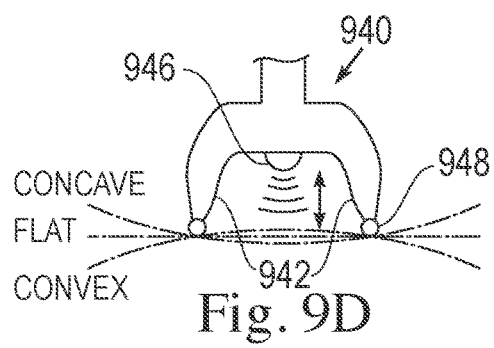
Figure 9E:
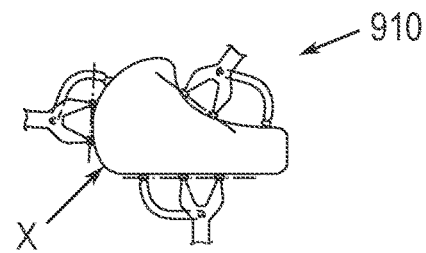
Figure 9F:
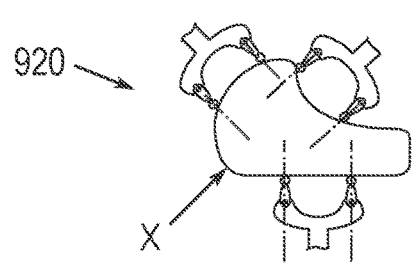
Figure 9G:
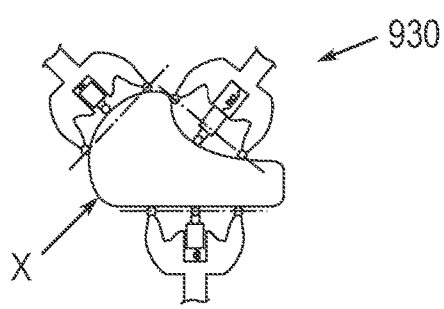
Figure 9H:
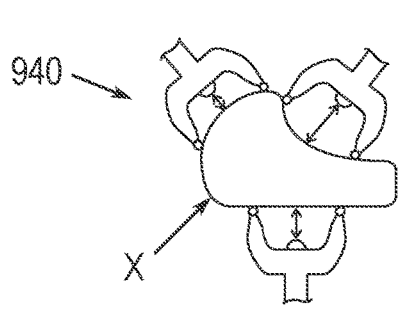

Referring to FIG. 9D, a gripper 940 has two legs 942 each connected to the gripper. The ends of the legs 942 include gripping elements 948 that contact the surface of an object. The object can have either a concave, convex, or flat surface, or combinations thereof. The gripping elements 948 maintain the gripper in contact with the object. The gripper elements can maintain contact with the object via magnetic force, suction force, non-permanent adhesion force, or other suitable means for maintaining the ends of the gripper in contact with the object. The gripper includes a non-contact sensor 946 (e.g., ultrasound, light, laser, etc.) that can measure the distance between the sensor 946 and the surface of the object in line with the sensor. The geometric details of the gripper 930 its legs and the location of the sensor. The geometric details of the object are also known. Accordingly, by measuring the distance between the sensor 946 and the surface of the object in accordance with the methods described above, wherein the rotation of a pivot is substituted for distance measured by the sensor, the orientation of an object being held by the gripper can be determined. As shown in FIG. 9H, gripper 940 is shown in contact with object X at various orientations along its surface. In accordance with the methods discussed above, the orientation of the object X relative to the gripper can be determined.

FIGS. 9A-H illustrate embodiments in which a device (e.g., grippers 910, 920, 930, or 940) can be used to determine the orientation of an object that is in contact with the device. The method fixed geometric data concerning the device, fixed geometric data concerning the object, and at least one variable (e.g., single pivot rotation, double pivot rotation, linear translation, or distance) to determine the orientation of the object relative to the device.

It should be understood that various combination, alternatives and modifications of the present invention could be devised by those skilled in the art. The present invention is intended to embrace all such alternatives, modifications and variances that fall within the scope of the appended claims.

While the invention has been particularly shown and described with reference to a preferred embodiment thereof, it will be understood by those skilled in the art that various changes in form and details may be made therein without departing from the spirit and scope of the invention.

The invention claimed is:

1. A method for determining orientation of a vehicle relative to a surface having defined geometric data that represents a curvature of the surface, the method comprising the steps of:
   measuring an angle of rotation about a hinge joint that is part of the vehicle, wherein the vehicle is configured to travel along the surface;
   determining the orientation of the vehicle relative to the surface based on vehicle geometric data, the surface geometric data and the measured angle of rotation; and
   controlling operation of the vehicle in view of the determined orientation.

2. The method of claim 1, wherein the hinge joint is disposed between a first chassis section and a second chassis section such that the first and second chassis sections are capable of rotation with respect to each other in at least one direction.

3. The method of claim 2, wherein the first chassis section includes a first wheel mounted thereto and the second chassis section includes a second wheel mounted thereto.

4. The method of claim 3, wherein the vehicle geometric data defines at least a distance between the hinge joint and a center of the first and second wheels, respectively, and a diameter of each of the wheels.

5. The method of claim 3, wherein the first wheel is a magnetic drive wheel.

6. The method of claim 3, wherein the second wheel is a magnetic drive wheel that is configured to move in at least two directions.

7. The method of claim 1, wherein the step of measuring the angle of rotation about the hinge joint comprises providing a sensor in the vehicle, the sensor being configured to measure the angle of rotation about the hinge joint.

8. The method of claim 1, wherein the vehicle is configured to transverse a curved surface in a helical path.

9. The method of claim 8, further including the step of determining when every loop of the helical path ends and a next loop starts by analyzing a plurality of sensor readings including wheel encoders and inertial measurement unit (IMU) data.

10. The method of claim 9, wherein the IMU data includes data obtained from accelerometers, gyroscopes and magnetometers.

11. The method of claim 1, wherein the surface comprises a cylindrical pipe and the step of determining the orientation of the vehicle corresponds to determining four possible orientations relative to a centerline of the cylindrical pipe and the method further includes the step of recording previous measurements of the hinge angle and determining which of the four possible orientations is a true orientation of the vehicle based on a start orientation and previous orientation changes of the vehicle.

12. The method of claim 8, wherein the vehicle includes a processor that operates to control a helical pitch and ensure that loops of the helix are spaced a constant distance from one another.

13. The method of claim 3, wherein the first wheel is a magnetic drive wheel that rotates about a first axis and the second wheel is a magnetic omni-wheel that rotates about a second axis that is perpendicular to the first axis, the omni-wheel including a plurality of rollers that are located about a periphery of the omni-wheel, each roller rotating in a same direction as rotation of the magnetic drive wheel.

14. The method of claim 1, wherein the hinge includes first and second rotation stops that are configured to prevent unintentional rotation about the hinge.

15. The method of claim 14, wherein the hinge joint is disposed between a first chassis section and a second chassis section such that the first and second chassis sections are capable of rotation with respect to each other in at least one direction, wherein the first and second rotation stops are mating surfaces on each of first and second chassis section.

16. A method for determining a diameter of a curved structure over which a vehicle travels comprising the steps of:
   determining geometric data of the vehicle;
   determining an orientation of the vehicle relative to the curved structure; and
   measuring an angle of rotation about a hinge joint that is part of the vehicle to determine the diameter of the curved structure.

17. The method of claim 16, further including the step of determining a maximum angle of rotation that has been measured and the step of determining the diameter of the curved structure is based on the recorded maximum angle of rotation and the geometric data of the vehicle.

18. The method of claim 16, wherein the curved structure comprises a pipe.

19. A system for determining orientation of a vehicle relative to a surface having defined geometric data that represents a curvature of the surface comprising:
   a drivable vehicle including:
      a hinge joint connecting a first part of the vehicle to a second part of the vehicle such that the first and second parts are capable of movement with respect to one another as the vehicle is driven across the surface, the movement of the first and second parts being translated into rotation of the hinge joint;
      a sensor configured to measure an angle of rotation about the hinge joint; and
      a processor configured to determine an orientation of the vehicle relative to the surface based on defined vehicle geometric data, the defined geometric data of the surface, and a measured angle of rotation about the hinge joint and wherein the processor is configured to control operation of the vehicle in view of a determined orientation.

20. The system of claim 19, wherein the hinge is selected from the group consisting of: a knuckle/pin hinge, a ball and detent hinge, and a length of flexible material.

21. The system of claim 19, wherein the first part comprises a first chassis section and the second part comprises a second chassis section.

22. The system of claim 21, wherein the first chassis section includes a first wheel mounted thereto and the second chassis section includes a second wheel mounted thereto.

23. The system of claim 19, wherein the defined vehicle geometric data includes at least a distance between the hinge joint and a center of the first and second wheels, respectively, and a diameter of the wheels.

24. The system of claim 19, wherein the first wheel comprises a magnetic drive wheel and a second wheel comprises a magnetic drive wheel.

25. The system of claim 19, wherein the vehicle is capable of traversing a curved surface in a helical pattern.

* * * * *